April 28, 1942.  R. A. GOEPFRICH  2,281,150
BRAKE
Filed Aug. 17, 1939

INVENTOR.
RUDOLPH A. GOEPFRICH
BY A R McCrady
ATTORNEY.

Patented Apr. 28, 1942

2,281,150

UNITED STATES PATENT OFFICE 2,281,150

BRAKE

Rudolph A. Goepfrich, South Bend, Ind., assignor to Bendix Aviation Corporation, South Bend, Ind., a corporation of Delaware Application August 17, 1939, Serial No. 290,547

6 Claims. (Cl. 188—79.5)

This invention relates to brakes, and is illustrated as embodied in an internal expanding brake for an automobile.

An object of the invention is to provide simple and reliable automatic means for adjusting the brake for wear of the brake lining, without effect from variations in the size of the brake drum as it expands and contracts when heated and cooled. To this end the adjustment means is of the type which is operated by the drum acting on one end of a plunger or the equivalent carried by the brake shoe, so that the clearance of the brake when released is determined by direct measurement from the braking surface of the drum.

According to the present invention the plunger or its equivalent is connected, as for example by an eccentric pivot, to a member rotatably mounted (for example) in the shoe web and which has mounted directly thereon a cam or the like which engages the usual fixed stop when the brake is released.

Figure 1:
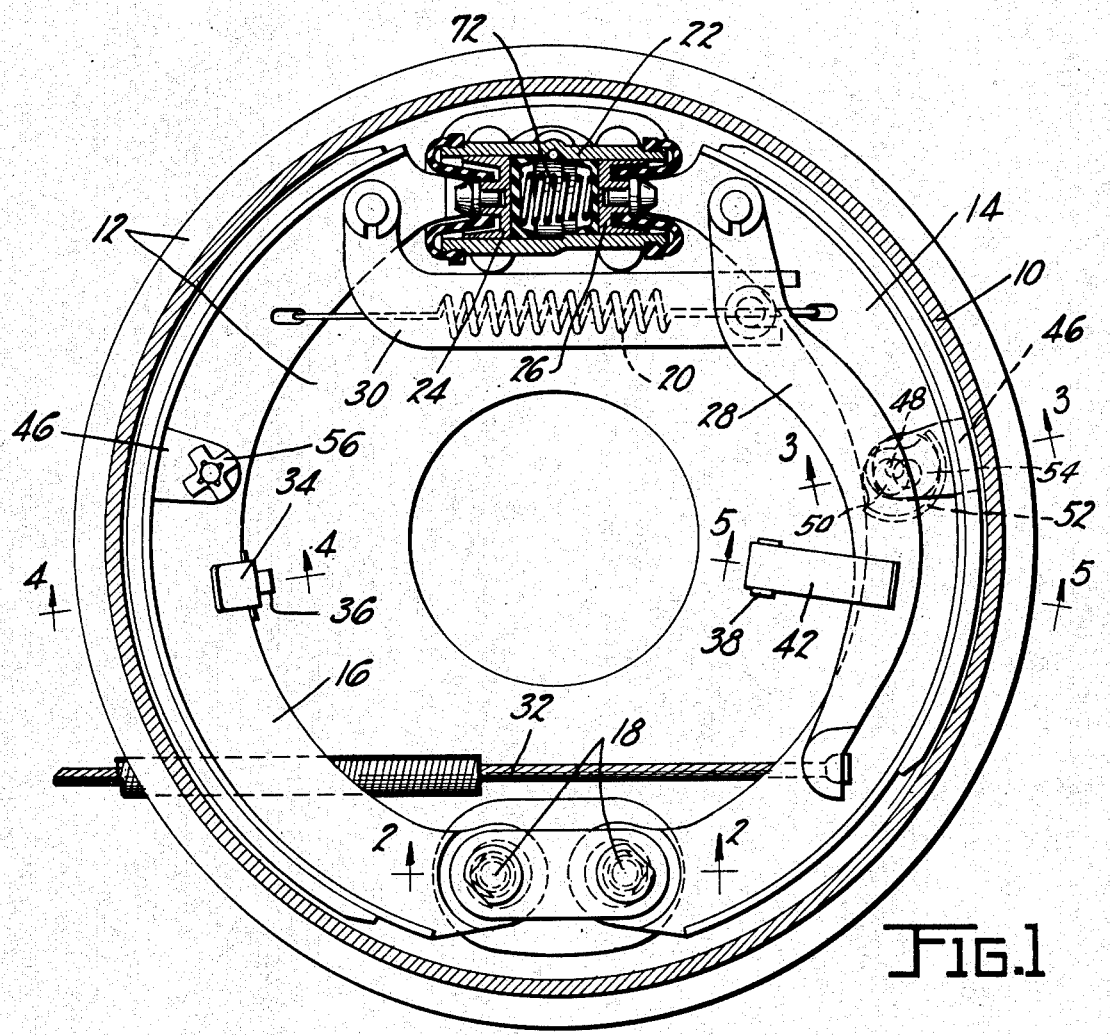
Figure 2:
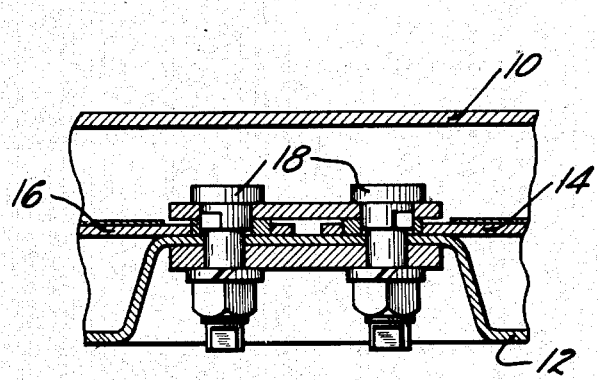
Figure 3:
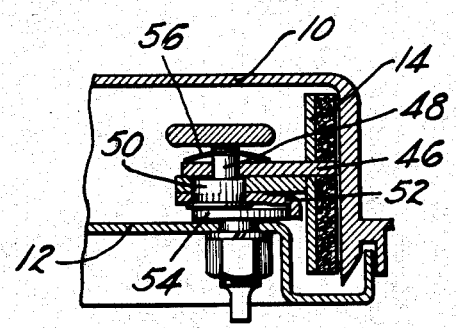

Various features of novelty relate to novel constructions and advantageous arrangements of the parts of this novel adjustment, which will be apparent from the following description of the embodiment shown in the accompanying drawing, in which:

Figure 1 is a vertical section through the brake, just inside the head of the brake drum, and showing the shoes in side elevation;

Figures 2 and 3 are partial sections on the lines 2—2 and 3—3 of Figure 1.

The brake illustrated in Figures 1–3 comprises a rotatable drum 10, at the open side of which is a support such as a backing plate 12. The illustrated friction means comprises two shoes 14 and 16, T-shaped in section to provide stiffening webs and outer rims faced with brake lining, and which are adjustably mounted at their lower ends on eccentric adjustable anchors 18. The brake is applied, against the resistance of a return spring 20, by means such as a hydraulic wheel cylinder 22 within which are large and small pistons 24 and 26 acting on the upper ends of the shoes.

When used on the rear wheels, the brakes may also be used as the emergency brakes, and are then provided also with mechanical applying means. The brake shown has a lever 28 pivoted on one shoe and connected to the other by a thrust member 30, the lever being actuated by the cable 32 of a Bowden-type control.

The shoe 16 is provided with a steady rest comprising a stamped U-section clip 34 embracing the web, and one arm of which has an opening to receive the bent-over end of a leaf spring 36 secured to the backing plate. The shoe 14 is provided with a steady rest comprising a stamping 38 formed to embrace the shoe web and which is engaged by a looped-over leaf spring 40, and which has secured thereto a leaf spring 42 serving as a steady rest for the lever 28.

Each of the shoes has a plunger, or equivalent member, 46 engaging one side of its web and arranged with its outer portion passing through alined slots of corresponding shape. The end of plunger 46 is flush with the surface of the brake lining facing the shoe, and is forced against the drum when the brake is applied, in such a manner as to shift the plunger inwardly if the lining has worn.

Each plunger 46 is pivotally connected to and mounted on a pin 48 extending eccentrically integrally from the end of a member 50 of circular outline, which is rotatably mounted in a hole in the shoe web. On the opposite side of the web from the plunger 46 there is fixed on member 50 (for example by pressing it on) a cam 52 of stamped steel having an edge flange which engages (when the brake is released) an eccentric adjustable and normally fixed stop 54. A spring washer 56 engaging a groove in the end of pin 48 engages the plunger 46 and serves to hold it frictionally against shifting except when forced inwardly by the brake drum.

In operation, each plunger 46 is gradually shifted inwardly by the drum as the brake lining wears, and turns the cam 52 to adjust the released position of the shoe to correspond to the wear.

As the above adjustment is actuated to compensate for lining wear, the pressure in the hydraulic lines, together with a spring 72 between them, holds the pistons 24 and 26 out against the shoes so that the volume of the hydraulic system is automatically increased to compensate for the shoe adjustment.

While an illustrative structure has been described in detail, it is not my intention to limit the scope of the invention to that structure, or otherwise than by the terms of the appended claims.

I claim:

1. A brake having, for use in combination with a brake drum, a shoe having movably mounted thereon a member shifted by said drum when the brake is applied after the shoe has worn, a member rotatably mounted on the shoe and which has eccentrically arranged means pivotally connecting it to the first member, a positioning device mounted on the rotatable member, and a positioning device engaged by the first device when the brake is released.

2. A brake having, for use in combination with a brake drum, a shoe having movably mounted thereon a member shifted by said drum when the brake is applied after the shoe has worn, a member rotatably mounted on the shoe and which is turned by shifting of the first member, and means for progressively moving the rotatable member toward the brake drum comprising a cam rigidly mounted on the rotatable member and a fixed stop engaged by the cam when the brake is released.

3. A brake shoe having a web and a rim faced with brake lining, a plunger on one side of the web extending at its end through openings in the rim and lining, a member having a part rotatably arranged in the web and having a pin extending eccentrically therefrom and which pin pivotally engages said plunger, a cam fixed on said member on the other side of the web from the plunger, a positioning device cooperating at times with said cam, and a spring device engaging the pin and said plunger and urging the plunger against said web.

4. A brake shoe having a web and a rim faced with brake lining, a plunger on one side of the web extending at its end through openings in the rim and lining, a member having a part rotatably arranged in the web, said member being pivotally connected to the plunger at a point eccentric to the member, a cam fixed on said member, a positioning device cooperating at times with said cam, and a spring device urging the plunger against said web.

5. A brake having, for use in combination with a brake drum, a shoe having movably mounted thereon a member shifted by said drum when the brake is applied after the shoe has worn, a member rotatably mounted on the shoe and which is turned by shifting of the first member, and a positioning device comprising a plurality of cooperating elements one mounted on the rotatable member and a second engaged by the first when the brake is released, at least one of said elements being movable to change the points of contact between the elements and at least one of said elements having a cam shaped surface so as to accomplish adjustment of the brake by moving the shoe toward the drum whenever the points of contact between the elements are changed.

6. A brake having, for use in combination with a brake drum, a shoe having movably mounted thereon a member shifted by said drum when the brake is applied after the shoe has worn, a member rotatably mounted on the shoe and pivotally connected to the first member, and a positioning device comprising a plurality of cooperating elements one mounted on the rotatable member and a second engaged by the first when the brake is released, at least one of said elements being movable to change the points of contact between the elements and at least one of said elements having a cam shaped surface so as to accomplish adjustment of the brake by moving the shoe toward the drum whenever the points of contact between the elements are changed.

RUDOLPH A. GOEPFRICH.